(12) United States Patent
Kurkure et al.

(10) Patent No.: US 11,271,904 B2
(45) Date of Patent: Mar. 8, 2022

(54) IDENTIFICATION AND ADJUSTMENT OF INEFFECTIVE FIREWALL RULES

(71) Applicant: Nicira, Inc., Palo Alto, CA (US)

(72) Inventors: Sameer Kurkure, Sunnyvale, CA (US); Subrahmanyam Manuguri, San Jose, CA (US); Anirban Sengupta, Saratoga, CA (US); Aman Raj, Stony Brook, NY (US); Kaushal Bansal, Sunnyvale, CA (US); Shadab Shah, Sunnyvale, CA (US)

(73) Assignee: Nicira, Inc., Palo Alto, CA (US)

( * ) Notice: Subject to any disclaimer, the term of this patent is extended or adjusted under 35 U.S.C. 154(b) by 497 days.

(21) Appl. No.: 15/388,151

(22) Filed: Dec. 22, 2016

(65) Prior Publication Data

US 2018/0183760 A1 Jun. 28, 2018

(51) Int. Cl.
*H04L 29/06* (2006.01)

(52) U.S. Cl.
CPC ...... *H04L 63/0263* (2013.01); *H04L 63/0227* (2013.01); *H04L 63/0236* (2013.01); *H04L 63/20* (2013.01)

(58) Field of Classification Search
CPC ......... H04L 63/0263; G06F 8/314; G06F 9/06
See application file for complete search history.

(56) References Cited

U.S. PATENT DOCUMENTS

| | | | |
|---|---|---|---|
| 8,448,220 B2 | 5/2013 | Roy et al. | |
| 8,578,500 B2 * | 11/2013 | Long | G06F 21/55 726/22 |
| 9,088,543 B2 | 7/2015 | Lemke et al. | |
| 9,130,901 B2 * | 9/2015 | Lee | H04L 63/0218 |
| 9,563,480 B2 * | 2/2017 | Messerli | G06F 9/5072 |
| 2009/0249472 A1 * | 10/2009 | Litvin | H04L 63/0263 726/14 |
| 2009/0300748 A1 | 12/2009 | Diehl et al. | |
| 2015/0237013 A1 | 8/2015 | Bansal et al. | |
| 2015/0281179 A1 * | 10/2015 | Raman | H04L 63/0272 726/11 |
| 2015/0281180 A1 * | 10/2015 | Raman | H04L 63/0272 726/15 |

(Continued)

OTHER PUBLICATIONS

Joseph, Herndon, *FairWarning IP, LLC* v. *Iatric Systems, Inc.* (Fed. Cir. 2016), Oct. 13, 2016, Patent Doc, pp. 1-3.*

(Continued)

*Primary Examiner* — Ellen Tran

(57) ABSTRACT

Network firewalls operate based on rules that define how a firewall should handle traffic passing through the firewall. At their most basic, firewall rules may indicate that certain network traffic should be denied from passing through a network firewall or indicate that certain network traffic should be allowed to pass through the network firewall. Manners of handling network traffic beyond simply allowing or denying the network traffic may also be defined by the rules. For instance, a rule may indicate that certain network traffic should be routed to a specific system. Thus, if an administrator of a network firewall determines that certain network traffic should be handled in a certain way by a network firewall, the administrator need only implement a firewall rule defining how that network traffic should be handled in the network firewall.

20 Claims, 7 Drawing Sheets

(56) References Cited

U.S. PATENT DOCUMENTS

2016/0191466 A1* 6/2016 Pernicha ................. H04L 63/20
726/1

OTHER PUBLICATIONS

"Notification of Transmittal of the International Search Report and the Written Opinion of the International Searching Authority, or the Declaration"; PCT/US2017/068023; dated Feb. 27, 2018; 12 pages.

* cited by examiner

| RULE TEST RESULT TABLE 800 | |
|---|---|
| Count of Rules | 1904 |
| Count of Unreachable Rules | 53 |
| Count of Partially Shadowed Rules | 68 |
| Count of Overlap Preceding Rules | 136 |
| Shadow Quotient | 1.124 |
| Percentage of Rules Shadowed | 6.32% |

Figure 8

IDENTIFICATION AND ADJUSTMENT OF INEFFECTIVE FIREWALL RULES

TECHNICAL BACKGROUND

Network firewalls operate based on rules that define how a firewall should handle network traffic passing through the firewall. At their most basic, firewall rules may indicate that certain network traffic should be denied from passing through a network firewall or indicate that certain network traffic should be allowed to pass through the network firewall. Manners of handling network traffic beyond simply allowing or denying the network traffic may also be defined by the rules. For instance, a rule may indicate that certain network traffic should be routed to a specific system. Thus, if an administrator of a network firewall determines that certain network traffic should be handled in a certain way by a network firewall, the administrator need only implement a firewall rule defining how that network traffic should be handled in the network firewall.

Firewall rules may continue to be added to a network firewall's rule set over time. Eventually, it is possible for a network firewall to operate using many hundreds or thousands of rules. The amount of processing resources that are required to handle network traffic increases with each rule that needs to be applied by the firewall. Despite some of these rules being ineffective due to other rules covering at least some of the network traffic conditions also covered by the ineffective rules, identifying those ineffective rules can be difficult when they are amongst a mass of other rules. Moreover, administrators may be hesitant to remove an ineffective rule to lessen the chance that the ineffective rule may be applicable in some unforeseen network traffic situation not covered by other rules.

To assist in finding ineffective firewall rules, existing solutions analyze rules targeted to simple network addresses (e.g., Internet Protocol (IP) addresses), media access control (MAC) addresses, and the like. However, some firewall systems, such as distributed firewalls in virtual computing environments, can define rules based on more complex networking concepts. Specifically, it is common to define rules based on compound groups, like IP-Sets, Security Groups and Service Groups. Current means of identifying ineffectual firewall rules are unable to operate on rules defined in the aforementioned manner.

OVERVIEW

The technology disclosed herein reduces the number of rules employed by a network firewall by adjusting ineffective firewall rules. In a particular embodiment, a method provides identifying related rules of a plurality of rules used by the network firewall. Rules of the plurality of rules are defined, at least in part, by one or more compound objects and two rules are related rules when there exists at least one network traffic pattern that can satisfy criteria for both of the two rules. The method further provides identifying one or more ineffective rules of the related rules based on the relationships between the rules and adjusting the one or more ineffective rules in the plurality of rules to obviate the ineffectiveness of the one or more ineffective rules.

In some embodiments, the method provides receiving confirmation from an administrator of the network firewall that the one or more ineffective rules should be removed from the plurality of rules. The adjusting of the one or more ineffective rules in these embodiments occurs in response to the confirmation.

In some embodiments, identifying the related rules comprises filtering each rule of the plurality of rules using a plurality of high precedence rules to determine whether one or more of the high precedence rules are related. In these embodiments, identifying the related rules may comprise, after filtering each rule, identifying compound group objects within the plurality of rules and performing one-to-one matching on the compound group objects. Furthermore, in some embodiments, identifying the related rules may further comprise, after performing one-to-one matching, for each rule of the plurality of rules, generating all possible traffic scenarios that match the rule and, for each of the possible traffic scenarios, determine whether one or more of the plurality of high precedence rules covers the possible traffic scenario.

In some embodiments, the method further provides identifying an updated rule to the plurality of rules and determining whether the updated rule impacts the relationships between the rules. In these embodiments, determining whether the updated rule impacts the relationships between the rules may comprise determining whether rules of the plurality of rules that come after the updated rule during rule application will become ineffective due to the updated rule and determining whether rules of the plurality of rules that come before the updated rule during the rule application will cause the updated rule to be ineffective. Also, in these embodiments, the updated rule may comprise an additional rule, an amendment to a rule, or a deletion of a rule.

In some embodiments, the method provides identifying one or more shadowed rules of the related rules based on the relationships between the rules. A rule is a shadowed rule when criteria for the shadowed rule is at least partially overlapped by one or more rules that come before the shadowed rule during rule application.

In some embodiments, adjusting the one or more ineffective rules comprises at least one of deleting at least one of the one or more ineffective rules and merging at least one of the one or more ineffective rules with one or more other rules.

In another embodiment, a system is provided for reducing the number of rules employed by a network firewall. The system includes one or more computer readable storage media and a processing system operatively coupled with the one or more computer readable storage media. Program instructions stored on the one or more computer readable storage media, when read and executed by the processing system, direct the processing system to identify related rules of a plurality of rules used by the network firewall. Rules of the plurality of rules are defined, at least in part, by one or more compound objects and two rules are related rules when there exists at least one network traffic pattern that can satisfy criteria for both of the two rules. The program instructions further direct the processing system to identify one or more ineffective rules of the related rules based on the relationships between the rules and adjust the one or more ineffective rules in the plurality of rules to obviate the ineffectiveness of the one or more ineffective rules.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 8 illustrates a table providing analysis results during ineffective firewall rule adjustment.

DETAILED DESCRIPTION

The implementations described below provide computing systems with the ability to identify ineffective firewall rules from a firewall rule set used by one or more network firewalls. More specifically, the implementations provide a manner by which ineffective firewall rules can be identified within firewall rules that are defined using compound groups. These compound groups may be defined by IP addresses, Security Groups, Service Groups, or some other manner of defining systems in a network—including combinations thereof. Such compound groups are common in virtual computing environments where virtual components (e.g., virtual machines (VMs), containers, etc.), due to their virtual nature, can be grouped and identified in manners beyond those used for physical network elements. A firewall configured to regulate communications exchanged with virtual components can therefore operate using rules defined by those compound groups rather than IP addresses, MAC addresses, and the like, that are usually used to designate physical systems. The rule management implementations herein are capable of analyzing compound group rules so that ineffective rules due to rule overlap can be identified and dealt with.

Figure 1:
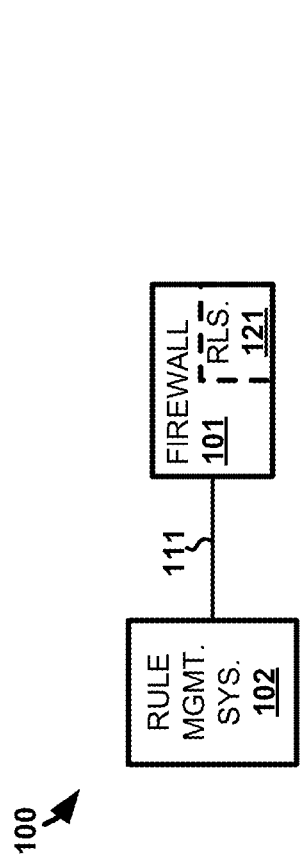
FIG. 1 illustrates a computing environment for ineffective firewall rule adjustment.

FIG. 1 illustrates computing environment 100 for ineffective firewall rule adjustment. Computing environment 100 includes network firewall 101 and rule management system 102. Network firewall 101 and rule management system 102 communicate over communication link 111. Network firewall 101 may be configured to regulate network communication traffic for any number of un-shown physical or virtual systems. In some cases, network firewall 101 may regulate network traffic exchanged with rule management system 102, although that is not necessary for rule management system 102 to perform as disclosed herein. In operation, rule management system 102 is configured to analyze firewall rules 121, which rule management system 102 obtains over communication link 111. In some examples, it is possible for rule management system 102 to obtain firewall rules 121 in some other manner, including from a separate storage system in communication with rule management system 102, using portable storage media (e.g., optical disks, flash drives, etc.), or maintaining a duplicate set of firewall rules 121 locally.

Figure 2:
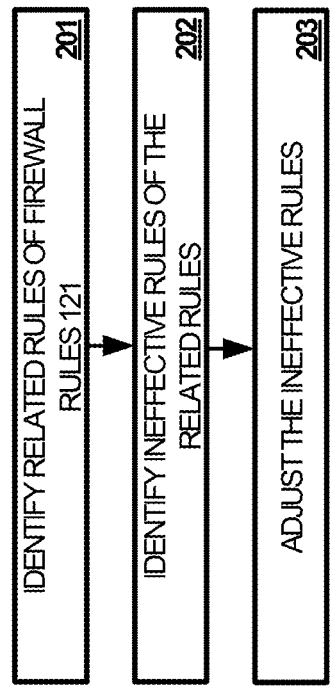
FIG. 2 illustrates a method of operating the computing environment for ineffective firewall rule adjustment.

FIG. 2 illustrates method 200 of operating computing environment 100 for ineffective firewall rule adjustment. Method 200 provides rule management system 102 identifying related rules firewall rules 121 (201). The rules are defined, at least in part, by one or more of the compound objects discussed above. Two rules are related rules when there exists at least one network traffic pattern that can satisfy criteria for both of the two rules (e.g., satisfies packet source/destination criteria set forth in the both rules). More than two rules may also be related to one another in some cases. In some cases, the relationships further indicate which rule of any two related rules takes precedence over the other. That is, network firewall 101 may apply firewall rules 121 in sequence and a related rule that falls first in that sequence would be of higher precedence.

Method 200 further provides rule management system 102 identifying one or more ineffective rules of the related rules based on the relationships between the rules (202). A rule may be ineffective if it is shadowed by one or more of its related rules. For instance, a rule would be ineffective if any traffic pattern that would satisfy criteria for that one rule would also satisfy a related rule of higher precedence. In that case, network traffic satisfying the ineffective rule would never reach the ineffective rule during processing by network firewall 101. Similarly, it is possible that more than one related rule having higher precedence would overlap the ineffective rule in combination (i.e., criteria of each higher precedence rule would only partially overlap the criteria of the ineffective rule).

Once the ineffective rules have been identified, method 200 provides rule management system 102 adjusting the one or more ineffective rules in the plurality of rules to obviate the ineffectiveness of the one or more ineffective rules (203). In order to obviate the ineffectiveness, the adjustment of the ineffective rules may include deleting the ineffective rule, merging the ineffective rule with one or more other rules, increasing the precedence of the ineffective rule, updating the rule's criteria, or performing some other obviating action. Regardless of how the adjustment is performed, upon completion, firewall rules 121 should no longer include the ineffective rules in their state prior to adjustment. Such a reduction in ineffective rules reduces the network traffic processing resources that may have been needed by network firewall 101 when those rules were in effect.

While method 200 focuses on ineffective rules, further embodiments may identify partially ineffective rules that are not rendered completely ineffective by higher precedence rules. In those embodiments, the partially ineffective rules may similarly be adjusted to obviate the fact that even a portion of their criteria is ineffective.

Figure 3:
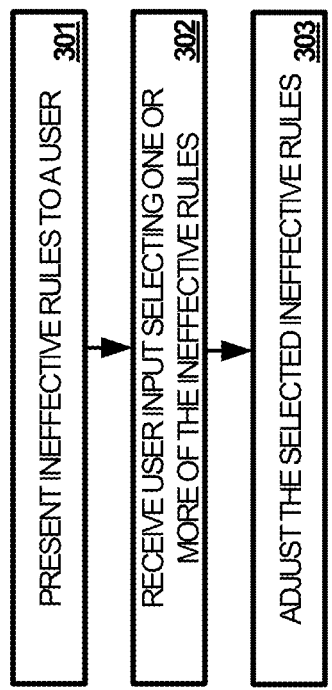
FIG. 3 illustrates another method of operating the computing environment for ineffective firewall rule adjustment.

FIG. 3 illustrates method 300 of operating computing environment 100 for ineffective firewall rule adjustment. In method 200, the ineffective rules may be automatically adjusted to keep network firewall 101 running most efficiently without any user interaction. However, some firewall administrators would prefer to have the final say on the adjustments made to firewall rules 121 by rule management system 102 and method 300 gives them that ability. In particular, method 300 provides rule management system 102 presenting the ineffective rules to a user of rule management system 102 before adjusting the ineffective rules in step 203 of method 200 (301). Rule management system 102 may present the ineffective rules to the user directly through a user interface of rule management system 102 or may transfer information about the ineffective rules to another computing system for presentation to the user through that systems user interface. Information presented about the ineffective rules may include the criteria that satisfies each of the rules, identification of the rule or rules that render ineffective each ineffective rule, possible adjustments for each rule, suggested adjustments for each rule, or any other type of information that a user may use to make an informed decision about how to adjust the ineffective rules.

Method 300 provides rule management system 102 receiving a user selection of the ineffective rules that the user desires to be adjusted (302). As noted above, rule management system 102 may present the ineffective rules via its own user interface or the ineffective rules may be presented through another computing systems user interface. Accordingly, the user input would also be received via the user interface of the system presenting the ineffective rules. In some cases, the selection may be a simple confirmation that all ineffective rules should be adjusted in a default manner or a manner determined by rule management system 102. In other cases, the user may select one or more of the ineffective rules that should be adjusted and provide input about how each ineffective rule should be adjusted. Rule management system 102 then adjusts the selected ineffective rules (303).

As with method 200, some examples of method 300 may present, to a user, information about rules that are not rendered completely ineffective in addition to the ineffective rules. Likewise, the user will be able to select how those additional partially ineffective rules are adjusted, if at all. Moreover, additional information may be presented to the user about firewall rules 121 to assist the user when determining how to adjust rules. For instance, the additional information may include statistics, such as a percentage of firewall rules 121 that are ineffective. If the percentage is negligible, then the user may choose not to make any adjustments at the present time.

Referring back to FIG. 1, network firewall 101 and rule management system 102 each comprise processing circuitry and a communication interface, or are implemented as virtual machines, containers, hypervisor elements, or otherwise, on one or more host computing systems having at least those components. Elements 101-102 may each further include other components such as a user interface, router, server, data storage system, and power supply. Elements 101-102 may each reside in a single device or may be distributed across multiple devices.

Communication links 111 uses metal, glass, air, space, or some other material as the transport media, or may comprise virtual links operating on top of such physical link resources. Communication link 111 could use various communication protocols, such as Time Division Multiplex (TDM), Internet Protocol (IP), Ethernet, communication signaling, system bus, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), Session Initiation Protocol (SIP), or some other communication format—including combinations thereof. Communication link 111 could be direct links or may include intermediate networks, systems, or devices.

Figure 4:
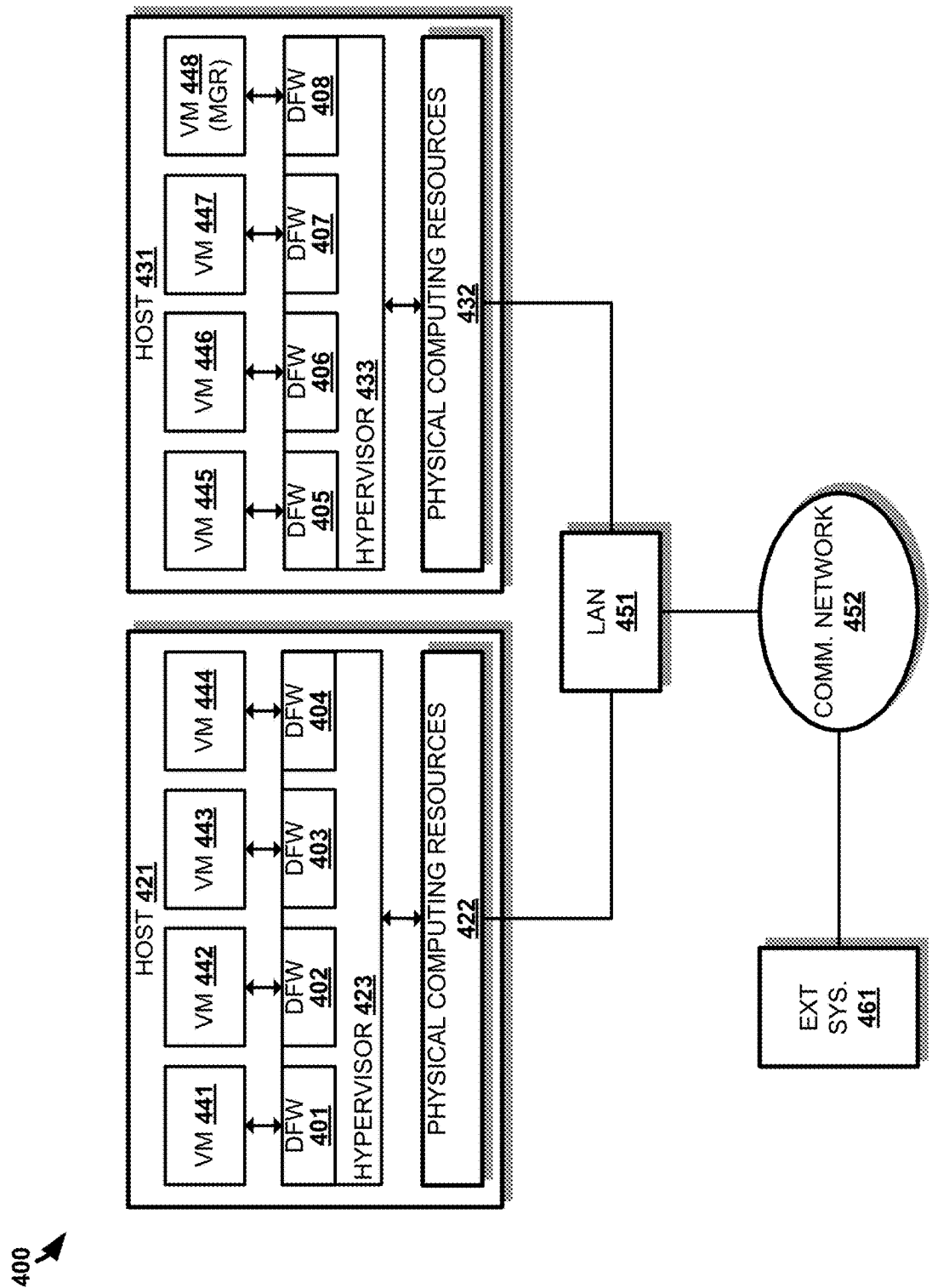
FIG. 4 illustrates another computing environment for ineffective firewall rule adjustment.

FIG. 4 illustrates computing environment 400 for ineffective firewall rule adjustment. Computing environment 400 includes host computing system 421, host computing system 431, local area network (LAN) 451, communication network 452, and external system 461. Within host computing system 421, physical computing resources 422 execute hypervisor 423 to host virtual machine 441, virtual machine 442, virtual machine 443, and virtual machine 444 Likewise, within host computing system 431, physical computing resources 432 execute hypervisor 433 to host virtual machine 445, virtual machine 446, virtual machine 447, and virtual machine 448. Physical computing resources 422 and 432 may include processing resources (e.g., CPU time/cores), memory space, network interfaces, user interfaces, or any other type of hardware resource. Hypervisors 423 and 433 implement virtual machines 441-448, at least in part, by allocating physical computing resources 422 and 423 among virtual machines 441-448. It should be understood that the number of host computing machines and number of virtual machines implemented on each host computing machine are merely exemplary. Computing environment 400 could include any number of host computing systems with any number of virtual machines implemented on each respective host computing system.

Furthermore, in this example virtual machine 448 is configured, possibly through applications executing thereon, to act as a management system for the distributed firewall in place to protect virtual machines 441-448. Each virtual machine has a corresponding instance of the virtual firewall (i.e., distributed firewall instances 401-408) executing within hypervisor 423 and hypervisor 433. The virtual firewall obviates the need for a traditional network firewall implemented in LAN 451. Moreover, the integration of the distributed firewall within hypervisor 423 and hypervisor 433 allows for the rules used by the distributed firewall to be defined based on compound objects as the distributed firewall can coordinate with hypervisor 423 and hypervisor 433 to obtain the information necessary to enforce those rules (e.g., which virtual machines fall into certain security groups). The arrangement of computing environment 400's virtual machine elements may be better visualized with respect to FIG. 5.

Figure 5:
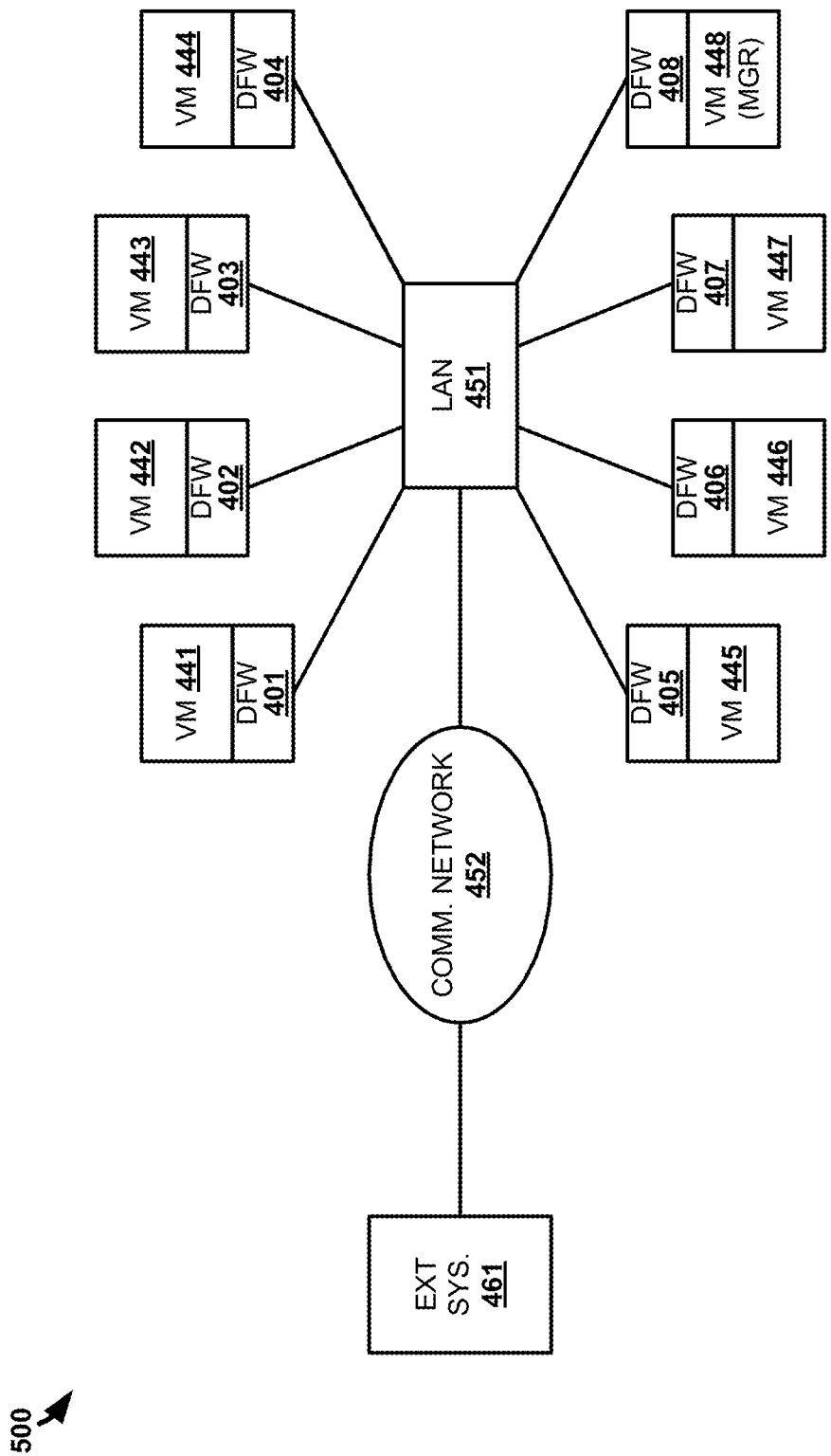
FIG. 5 illustrates a logical arrangement of the other computing environment for ineffective firewall rule adjustment.

FIG. 5 illustrates logical arrangement 500 of computing environment 400 for ineffective firewall rule adjustment. Logical arrangement 500 shows how the virtual machines and firewalls of computing environment 400 would be arranged if implemented as physical computing devices rather than virtual elements. Specifically, virtual machines 441-448 operate as though they are eight physical computing machines interconnected using LAN 451. Rather than one firewall protecting systems on LAN 451 from external systems, such as external system 461 or some other system on communication network 452, each virtual machine is protected by a respective instance of the distributed firewall. The distributed firewall can therefore regulate traffic between virtual machines in addition to traffic exchanged with external systems. It should further be understood that, while logical arrangement 500 indicates that all communications between virtual machines would pass through LAN 451, computing environment 400 may be configured such that virtual machines on the same host computing system (e.g., virtual machine 442 and virtual machine 443) may exchange communications without those communications being routed out of the host computing system to LAN 451.

Figure 6:
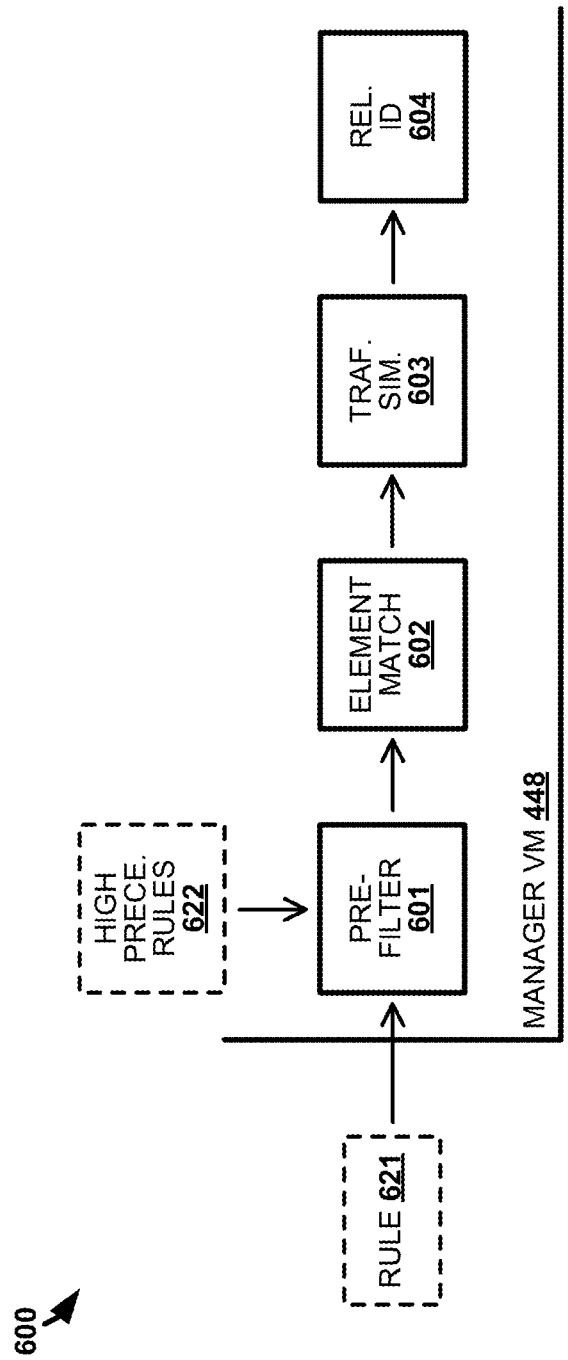
FIG. 6 illustrates an operational scenario of the other computing environment for ineffective firewall rule adjustment.

FIG. 6 illustrates operational scenario 600 of computing environment 400 for ineffective firewall rule adjustment. In this example, firewall management virtual machine 448 is tasked with controlling the functionality of the distributed firewall. As such, firewall management virtual machine 448 may provide each of distributed firewall instances 401-408 with their respective rule sets to implement an overall firewall policy for the distributed firewall and may adjust those rule sets based on the teachings herein for reducing the ineffective rules in those sets. Operational scenario 600 shows only a single firewall rule 621 passing through processing stages 601-604, however, the same scenario will be applied for each rule in a set of rules (i.e., a set of rules for one or more of distributed firewall instances 401-408) being analyzed by firewall management virtual machine 448. In some cases, operational scenario 600 is applied to the rules in order of precedence so that the effect of higher precedence rules on a rule in process can be determined on the fly. Processing the rules in other orders, while possible, may require all rules to be processed before a determination of rule ineffectiveness can be made.

At pre-filtering stage 601, firewall management virtual machine 448 pre-filters firewall rule 621 against high precedence rules 622. High precedence rules 622, as implied by their name, comprise one or more firewall rules that are of the highest precedence and could potentially shadow firewall rule 621. In one example, the pre-filtering is performed on the "applied to" (or equivalent) field of firewall rule 621 to determine whether there is any overlap between the "applied to" field of firewall rule 621 and the "applied to" fields of one or more of high precedence rules 622. The "applied to" field defines the scope of where the rule will be published (e.g., to which of distributed firewall instances 401-408). For example, the "applied to" field of firewall rule 621 may indicate host computing system 421 and firewall rule 621 would therefore be used on distributed firewall instances 401-404. One of high precedence rules 622 that applies to one or more of distributed firewall instances 401-404 as well may at least partially shadow firewall rule 621.

Firewall rule 621 may include any number of other fields that define the rule in addition to and "applied to" field that is the focus of stage 601. The additional fields may include a rule identifier field, a rule name field, a source field, a destination field, a service field, and an action field. The source and destination fields may indicate the source or destination of network packet traffic in a traditional IP address/subnet manner, however, the source and destination of firewall rule 621 use compound groups to define the source and destination of network traffic. The compound groups may identify source and/or destination by cluster, datacenter, distributed port group, IP sets, MAC sets, legacy port group, logical switch resource pool, security group, virtual application, virtual machine, virtual network interface card (vNIC), or in some other manner. The service field defines a protocol of data that the network traffic is carrying (e.g. TCP, UDP, FTP, ICMP, etc.). The action field defines what action should be taken on packets that meet the criteria defined by the source, destination, and service fields. Possible actions may include blocking the network traffic, allowing the network traffic, rejecting the network traffic (i.e., send traffic back to origin), or some other action that may be taken on network traffic.

After pre-filtering stage 601, firewall rule 621 moves to element matching stage 602 where firewall management virtual machine 448 determines whether the compound groups in the source and destination fields of firewall rule 621 match the compound groups in other firewall rules. If the source and destination fields of firewall rule 621 are identical to the source and destination fields in a higher precedence rule, then the higher precedence rule would catch that traffic before the firewall rule 621 and would therefore render firewall rule 621 unreachable and ineffective. In cases where a higher precedence rule does not include identical source and destination fields, the compound groups used in the source and destination fields may be expanded to determine whether firewall rule 621 is partially shadowed by a higher precedence rule. For example, a source compound group of a higher precedence rule may include some portion of sources from the source compound group of firewall rule 621. That overlapping portion of sources may otherwise be overlooked if the compound groups were not expanded upon to determine the sources identified by each compound group based on the raw values therein.

The processing of firewall rule 621 then moves to a traffic simulation stage 603 and firewall management virtual machine 448 generates all possible traffic scenarios that would satisfy the criteria of firewall rule 621. For each of the possible traffic scenarios, firewall management virtual machine 448 determines whether a higher precedence rule would also be satisfied by that particular traffic scenario. Any of the traffic scenarios that also satisfy a higher precedence rule are noted by firewall management virtual machine 448 along with the higher the corresponding higher precedence rules.

The processing of firewall rule 621 proceeds to relationship identifier stage 604, where the results of processing stages 601-603 are compiled to identify all higher precedence rules that at least partially shadow firewall rule 621. If firewall rule 621 is completely shadowed due to one or more higher precedence rules, then firewall rule 621 is an ineffective rule as it would be entirely unreachable to any traffic pattern that satisfies the criteria of firewall rule 621. In some examples, the relationships identified for firewall rule 621 may be compiled with any relationships identified for other rules of firewall rule 621's rule set to generate statistics for the rule set as a whole, as discussed in more detail with respect to FIG. 8 below.

Once the relationships have been identified, firewall management virtual machine 448 may be configured to automatically adjust firewall rule 621 or any other rule determined to be at least partially ineffective. For instance, if firewall rule 621 is fully shadowed by one or more higher precedence rules and, thereby, completely ineffective, firewall management virtual machine 448 may be configured to delete firewall rule 621. Alternatively, if firewall rule 621 is only partially shadowed by one or more higher precedent rules, then firewall management virtual machine 448 may merge the remaining non-shadowed criteria of firewall rule 621 into another firewall rule before deleting firewall rule 621. For example, the non-shadowed "applied to"/source/destination criteria may be merged into the "applied to"/source/destination criteria of a rule having similar "applied to"/source/destination criteria and the same action field. Other manners by which firewall rule 621 could be adjusted, such as amending the criteria of firewall rule 621 to cover only the non-shadowed criteria, may also be used. In other examples, rather than adjusting firewall rules automatically, firewall management virtual machine 448 may present recommended actions to a user so that the user may decide whether to instruct firewall management virtual machine 448 to take the recommended action, do nothing, or take some other action. In those examples, the information about the firewall rules and recommended actions may be transferred from firewall management virtual machine 448 to a computing device of the user (e.g., the user's desktop workstation) for presentation.

Figure 7:
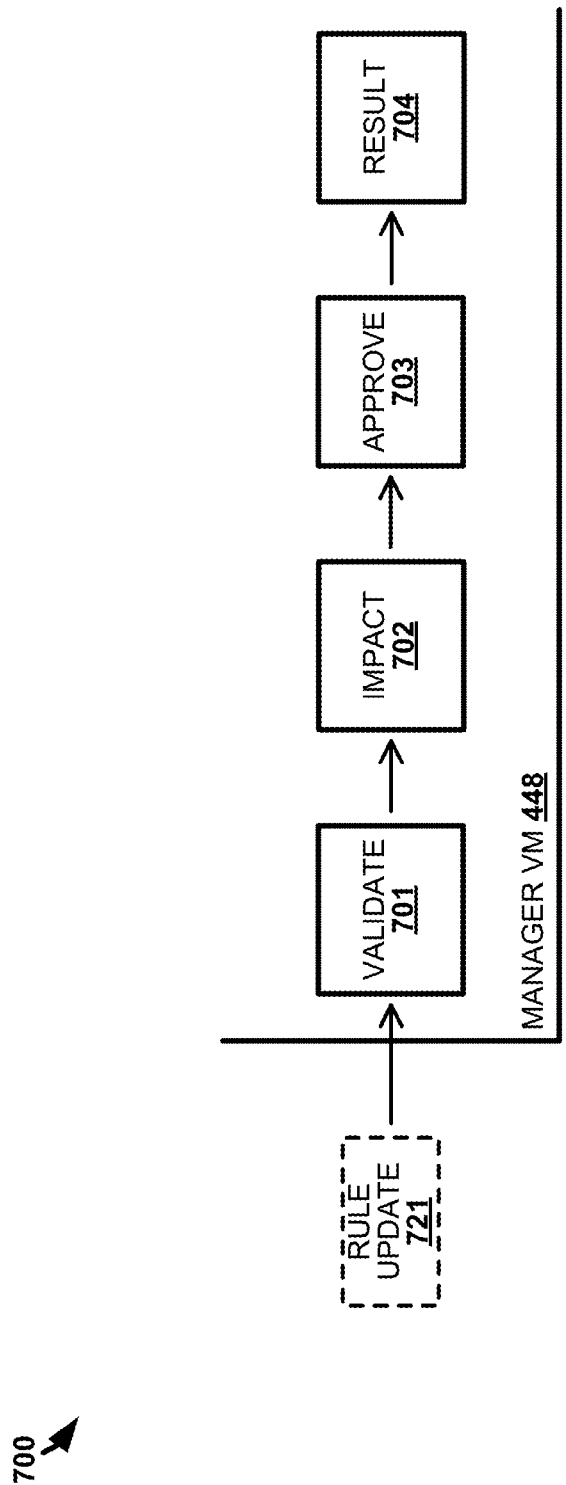
FIG. 7 illustrates another operational scenario of the other computing environment for ineffective firewall rule adjustment.

FIG. 7 illustrates operational scenario 700 of the computing environment 400 for ineffective firewall rule adjustment. Operational scenario 600 provided an example where all firewall rules in a rule set could be processed to identify ineffective firewall rules. Operational scenario 700, on the other hand, describes processing that could take place whenever an update is performed to that rule set after operational scenario 600 has been performed once so that it does not need to be performed again on the entire rule set. Firewall rule update 721 may be received from a user and comprises an additional firewall rule for the rule set, a deletion of a rule from the rule set, or a change to an existing rule in the rule set. Operational scenario 700 therefore processes firewall rule update 721 to determine how firewall rule update 721 would affect other rules in the rule set.

At validation stage 701, firewall rule update 721 is evaluated by firewall management virtual machine 448 to ensure the firewall rule update 721 results in a valid rule. That is, if firewall rule update 721 is a new rule, then firewall management virtual machine 448 determines whether that new rule is valid or, if firewall rule is a change to an existing rule, then firewall management virtual machine 448 determines whether those changes result in the existing rule still being a valid rule.

The processing then moves to impact stage 702, where firewall management virtual machine 448 determines how firewall rule update 721 will impact lower precedence rules in the rule set and how higher precedence rules in the rule set will impact firewall rule update 721. For example, firewall management virtual machine 448 determines whether firewall rule update 721 will result in a rule with criteria that shadows, fully or partially, lower precedence rules in the rule set, which may render those lower precedence rules ineffective. Likewise, firewall management virtual machine 448 determines whether firewall rule update 721 results in a rule that is shadowed, at least in part, by higher precedence rules that may render firewall rule update 721 ineffective.

At processing stage 703, the results of impact stage 702 are presented to the user so that the user can indicate whether firewall rule update 721 is still approved for application to the rule set. In some cases, firewall rule update 721 may have no impact on lower precedence rules and have no impact from higher precedence rules, thereby making approval an easy decision for the user. However, in other cases, firewall rule update 721 may at least partially shadow lower precedence rules or be at least partially shadowed by higher precedence rules. In these cases, the user may determine not to approve the application of firewall rule update 721 as is. Instead, the user may instruct firewall management virtual machine 448 to adjust firewall rule update 721, adjust lower precedence rules, and/or adjust higher precedence rules to account for the results of impact stage 702. Firewall management virtual machine 448 may provide suggestions about how firewall rule update 721, or other firewall rules, may be modified, merged, etc. to result in a less impactful change to the rule set. Once changes to firewall rule update 721, or other firewall rules, have been approved, result stage 704 applies those changes to the rule set.

FIG. 8 illustrates rule test result table 800 that provides analysis results during ineffective firewall rule adjustment. In particular, rule test result table 800 may be compiled from the results of processing the firewall rules in a firewall rule set using operational scenario 600. The data of rule test result table 800 may be maintained internally for use by firewall management virtual machine 448 or may be presented to a user in some manner. Presentation to a user allows a user to take action on the rule set based on the information shown in rule test result table 800. In this example, the processed rule set includes 1,904 rules. 53 of those rules are unreachable rules and are, therefore, ineffective as they will never be applied to any potential traffic pattern due to being shadowed by higher precedence rules. 68 of the rules are partially shadowed and, therefore, only a portion of the possible traffic patterns that would satisfy the criteria of the 68 rules will ever be able to reach the rules. The other traffic patterns will be captured by higher precedence rules.

Also, rule test result table 800 shows that 136 rules in the rule set are responsible for shadowing all or part of lower precedence rules (i.e., are responsible for the 53 unreachable rules and the 68 partially shadowed rules). Rule test result table 800 then shows that the rule set has a shadow quotient of 1.124. The shadow quotient comprises a ratio of the total number of rules casting a shadow to the total number of unreachable or partially shadowed rules. In this example, the shadow quotient is the 136 overlap preceding rules over the 121 unreachable and partially shadowed rules. Finally, rule test result table 800 shows a percentage of the total rules that are unreachable or partially shadowed, which is 6.32%.

When presented to a user, the information in rule test result table 800 provides the user with an overview of whether, and to what degree, unreachable and/or partially shadowed rules of a rule set may be impacting the performance of a firewall system, such as the distributed firewall of computing environment 400. In some cases, the user may determine that there would be minimal impact on firewall performance achieved by adjusting the rule set and, therefore, may decide to leave the rule set as is. However, in other cases, the impact may be greater and the user may therefore instruct firewall management virtual machine 448 to adjust rules of rule set. It should be understood that rule test result table 800 may show more or fewer metrics in other examples to provide the user with different details regarding the shadowing of rules in the rule set.

Figure 9:
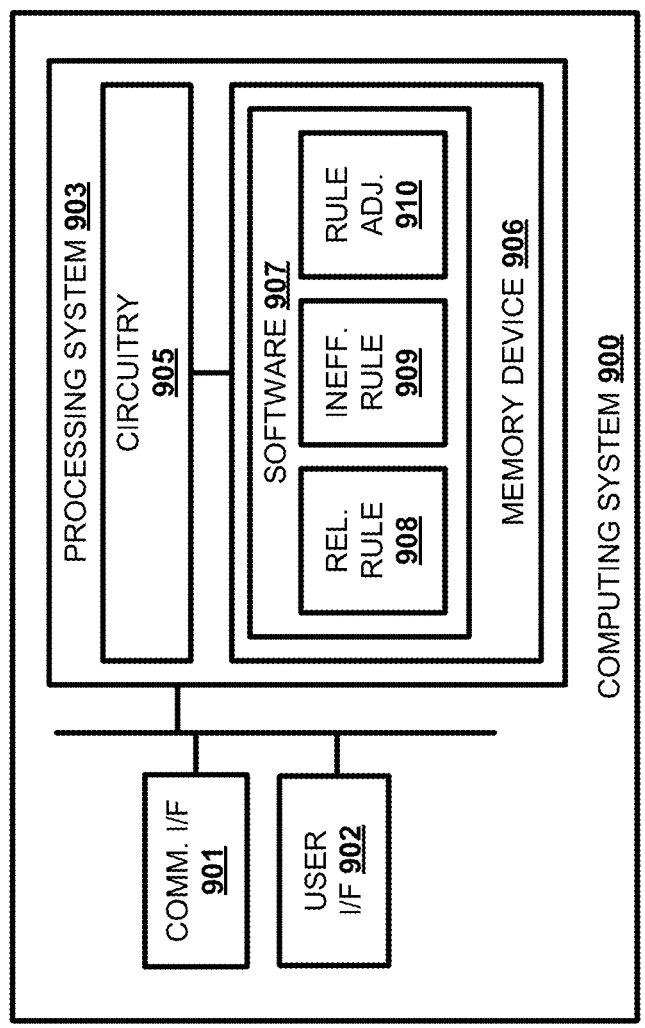
FIG. 9 illustrates a computing architecture used for ineffective firewall rule adjustment.

FIG. 9 illustrates computing system 900 for ineffective firewall rule adjustment according to one implementation. Computing system 900 is representative of any computing system or systems with which the various operational architectures, processes, scenarios, and sequences disclosed herein enable ineffective firewall rule adjustment. Computing system 900 is an example of a computing system for implementing rule management system 102, network firewall 101, and host computing systems 421 and 431, although other examples may exist. Computing system 900 comprises communication interface 901, user interface 902, and processing system 903. Processing system 903 is linked to communication interface 901 and user interface 902. Processing system 903 includes processing circuitry 905 and memory device 906 that stores operating software 907. Computing system 900 may include other well-known components such as a battery and enclosure that are not shown for clarity.

Communication interface 901 comprises components that communicate over communication links, such as network cards, ports, radio frequency (RF), processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Processing circuitry 905 comprises microprocessor and other circuitry that retrieves and executes operating software 907 from memory device 906. Memory device 906 may include volatile and nonvolatile, removable and non-removable media implemented in any method or technology for storage of information, such as computer readable instructions, data structures, program modules, or other data. Memory device 906 may be implemented as a single storage device, but may also be implemented across multiple storage devices or sub-systems. Memory device 906 may comprise additional elements, such as a controller to read operating software 907. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 905 is typically mounted on a circuit board that may also hold memory device 906 and portions of communication interface 901 and user interface 902. Operating software 907 comprises computer programs, firmware, or some other form of machine-readable program instructions. Operating software 907 includes related rule module 908, ineffective rule module 909, and rule adjustment module 910, although any number of software modules within the application may provide the same operation. Operating software 907 may further include an operating system, utilities, drivers, network interfaces, applications, or some other type of software. When executed by processing circuitry 905, operating software 907 directs processing system 903 to operate computing system 900 as described herein.

In a particular example, related rule module 908 directs processing system 903, to identify related rules of a plurality of rules used by the network firewall. Rules of the plurality of rules are defined, at least in part, by one or more compound objects and two rules are related rules when there exists at least one network traffic pattern that can satisfy criteria for both of the two rules. Ineffective rule module 909 directs processing system 903 to identify one or more ineffective rules of the related rules based on the relationships between the rules. Rule adjustment module 910 directs processing system 903 to adjust the one or more ineffective rules in the plurality of rules to obviate the ineffectiveness of the one or more ineffective rules.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of reducing the number of rules employed by a network firewall, the method comprising:
   identifying related rules of a plurality of rules used by the network firewall, wherein at least one of the plurality of rules comprise criteria of one or more compound groups that each identify a source or destination virtual machine based on at least a security group or a service group for the virtual machine and wherein two rules are related rules when there exists at least one network traffic pattern that can satisfy criteria for both of the rules, including criteria of one or more compound groups of at least one of the two rules;
   identifying one or more ineffective rules of the related rules based on the relationships between the rules;
   adjusting, in the network firewall, the one or more ineffective rules in the plurality of rules to reduce the number of ineffective rules in the plurality of rules used by the network firewall when handling network traffic exchanged with a plurality of virtual machines based on the plurality of rules; and
   in the network firewall, after adjusting the one or more ineffective rules in the plurality of rules, applying the plurality of rules to the network traffic.

2. The method of claim 1, further comprising:
   presenting, to an administrator of the network firewall, statistics about the one or more ineffective rules and the plurality of rules;
   receiving confirmation from the administrator of the network firewall that the one or more ineffective rules should be removed from the plurality of rules; and
   wherein adjusting the one or more ineffective rules occurs in response to the confirmation.

3. The method of claim 1, wherein identifying the related rules comprises:
   filtering each rule of the plurality of rules using a plurality of high precedence rules to determine whether one or more of the high precedence rules are related.

4. The method of claim 3, wherein identifying the related rules further comprises:
   after filtering each rule, identifying the one or more compound groups within the plurality of rules; and
   performing one-to-one matching on the one or more compound groups.

5. The method of claim 4, wherein identifying the related rules further comprises:
   after performing one-to-one matching, for each rule of the plurality of rules, generating all possible traffic scenarios that match the rule; and
   for each of the possible traffic scenarios, determine whether one or more of the plurality of high precedence rules covers the possible traffic scenario.

6. The method of claim 1, further comprising:
   identifying an updated rule to the plurality of rules;
   determining whether the updated rule impacts the relationships between the rules.

7. The method of claim 6, wherein determining whether the updated rule impacts the relationships between the rules comprises:
   determining whether rules of the plurality of rules that come after the updated rule during rule application will become ineffective due to the updated rule; and determining whether rules of the plurality of rules that come before the updated rule during the rule application will cause the updated rule to be ineffective.

8. The method of claim 6, wherein the updated rule comprises an additional rule, an amendment to a rule, or a deletion of a rule.

9. The method of claim 1, further comprising:
identifying one or more shadowed rules of the related rules based on the relationships between the rules, wherein a rule is a shadowed rule when criteria for the shadowed rule is at least partially overlapped by one or more rules that come before the shadowed rule during rule application.

10. The method of claim 1, wherein adjusting the one or more ineffective rules comprises at least one of deleting at least one of the one or more ineffective rules and merging at least one of the one or more ineffective rules with one or more other rules.

11. A system for reducing the number of rules employed by a network firewall, the system comprising:
one or more non-transitory computer readable storage media;
a processing system operatively coupled with the one or more computer readable storage media; and
program instructions stored on the one or more computer readable storage media that, when read and executed by the processing system, direct the processing system to:
identify related rules of a plurality of rules used by the network firewall, wherein at least one of the plurality of rules comprise criteria of one or more compound groups that each identify a source or destination virtual machine based on at least a security group or a service group for the virtual machine and wherein two rules are related rules when there exists at least one network traffic pattern that can satisfy criteria for both of the rules, including criteria of one or more compound groups of at least one of the two rules;
identify one or more ineffective rules of the related rules based on the relationships between the rules;
adjust, in the network firewall, the one or more ineffective rules in the plurality of rules to reduce the number of ineffective rules in the plurality of rules used by the network firewall when handling network traffic exchanged with a plurality of virtual machines based on the plurality of rules; and
in the network firewall, after the one or more ineffective rules in the plurality of rules are adjusted, apply the plurality of rules to the network traffic.

12. The system of claim 11, wherein the program instructions further direct the processing system to:
present, to an administrator of the network firewall, statistics about the one or more ineffective rules and the plurality of rules;
receive confirmation from the administrator of the network firewall that the one or more ineffective rules should be removed from the plurality of rules; and
wherein adjustment of the one or more ineffective rules occurs in response to the confirmation.

13. The system of claim 11, wherein to identify the related rules the program instructions direct the processing system to:
filter each rule of the plurality of rules using a plurality of high precedence rules to determine whether one or more of the high precedence rules are related.

14. The system of claim 13, wherein to identify the related rules the program instructions further direct the processing system to:
after filtering each rule, identify the one or more compound groups within the plurality of rules; and
perform one-to-one matching on the one or more compound groups.

15. The system of claim 14, wherein to identify the related rules the program instructions further direct the processing system to:
after performing one-to-one matching, for each rule of the plurality of rules, generating all possible traffic scenarios that match the rule; and
for each of the possible traffic scenarios, determine whether one or more of the plurality of high precedence rules covers the possible traffic scenario.

16. The system of claim 11, wherein the program instructions further direct the processing system to:
identify an updated rule to the plurality of rules;
determine whether the updated rule impacts the relationships between the rules.

17. The system of claim 16, wherein to determine whether the updated rule impacts the relationships between the rules the program instructions direct the processing system to:
determine whether rules of the plurality of rules that come after the updated rule during rule application will become ineffective due to the updated rule; and
determine whether rules of the plurality of rules that come before the updated rule during the rule application will cause the updated rule to be ineffective.

18. The system of claim 16, wherein the updated rule comprises an additional rule, an amendment to a rule, or a deletion of a rule.

19. The system of claim 11, wherein the program instructions further direct the processing system to:
identify one or more shadowed rules of the related rules based on the relationships between the rules, wherein a rule is a shadowed rule when criteria for the shadowed rule is at least partially overlapped by one or more rules that come before the shadowed rule during rule application.

20. The system of claim 11, wherein to adjust the one or more ineffective rules, the program instructions direct the processing system to at least one of delete at least one of the one or more ineffective rules and merge at least one of the one or more ineffective rules with one or more other rules.

* * * * *